United States Patent

[11] 3,614,180

| [72] | Inventor | Palle-Finn Beer |
| --- | --- | --- |
| | | Lidingo, Sweden |
| [21] | Appl. No. | 20,633 |
| [22] | Filed | Mar. 18, 1970 |
| [45] | Patented | Oct. 19, 1971 |
| [73] | Assignee | AGA Aktiebolag |
| | | Lidingo, Sweden |
| [32] | Priority | Mar. 19, 1969 |
| [33] | | Sweden |
| [31] | | 3785/69 |

[54] BEARING ARRANGEMENT FOR A ROTOR
7 Claims, 1 Drawing Fig.

[52] U.S. Cl. ................................................. 308/10
[51] Int. Cl. ................................................. F16c 39/06
[50] Field of Search ........................................... 308/10;
114/145; 348/8; 73/231 M, 232, 187, 185

[56] References Cited
UNITED STATES PATENTS
| 934,824 | 9/1909 | Mensing .................. | 73/185 |
| --- | --- | --- | --- |
| 2,443,856 | 6/1948 | Hermanny ................ | 73/187 |
| 3,216,655 | 11/1965 | Wind ...................... | 308/10 |
| 3,221,389 | 12/1965 | Cowell .................... | 308/10 |
| 3,233,950 | 2/1966 | Baermann ................ | 308/10 |
| 3,397,929 | 8/1968 | Gill ........................ | 308/10 |
| 3,476,449 | 11/1969 | Chaboseau ............... | 308/10 |

*Primary Examiner*—D. F. Duggan
*Assistant Examiner*—R. Skudy
*Attorney*—Larson, Taylor and Hinds

ABSTRACT: Bearing arrangement for a rotor which is rotatable around a fixed axle and subjected to a varying axial load. This load is taken up by the magnetic repulsion between a magnetic element connected to the axle and a magnetic element connected to the rotor. The axial repulsion force between the magnetic elements is counteracted by an axial pressure in an axial contact seating whereby an increasing axial load on the rotor brings about an axial pressure in the contact seating which diminishes towards zero.

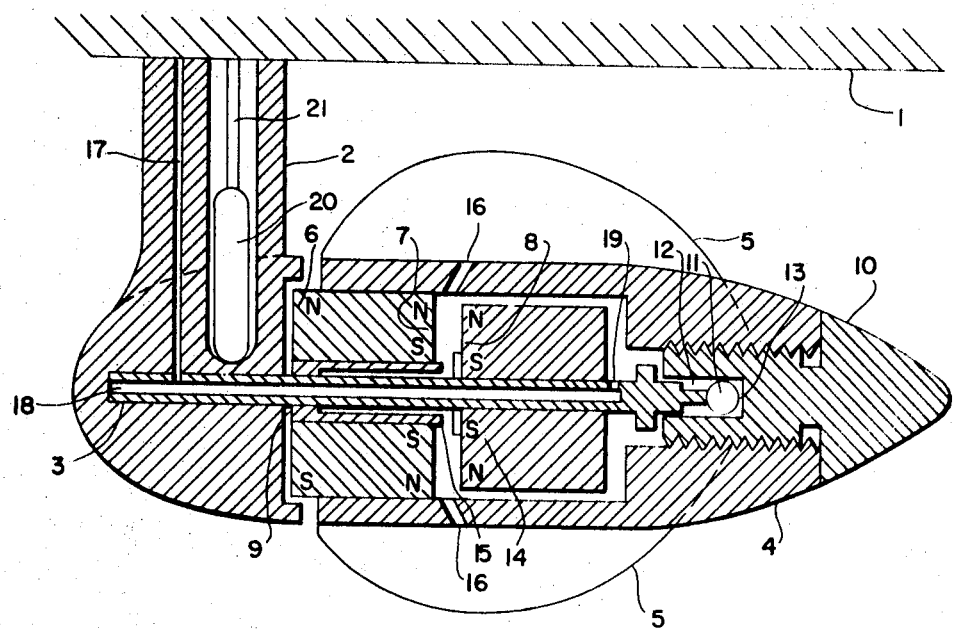

3,614,180

BEARING ARRANGEMENT FOR A ROTOR

FIELD OF THE INVENTION

The present invention relates to a bearing arrangement for a rotor which is rotatable around a fixed axle.

BACKGROUND OF THE INVENTION AND DESCRIPTION OF THE PRIOR ART

In many constructions comprising an element which is rotatable in a support, it is of greatest importance to reduce the bearing friction to the absolute minimum. To achieve this result it has been suggested previously to make use of magnetic power effects, either in the form of attraction or in that of repulsion. It has not been possible however in earlier constructions completely to eliminate the axial friction in constructions where the loads are in the main axially. It has only been possible to reduce them.

SUMMARY OF THE INVENTION

The present invention relates to a bearing arrangement for a rotating element which is so realized that within a certain range of loading, which corresponds to the normal range of application of the arrangement, the axial friction is equal to zero. The bearing arrangement is assumed to comprise a magnetic element connected to the axle and another magnetic element connected to the rotor, the axial load on the rotor being taken up by the magnetic repulsion between these elements and further on an axial contact seating between the axle and the rotor. The axial pressure in this axial seating is arranged to counteract the axial repulsion force between the magnetic elements so that an increasing axial load on the rotor brings about an axial pressure in the contact seating which diminishes towards zero with increasing load on the rotor.

THE DRAWING

The invention will be described in the following with the help of the enclosed drawing which shows a rotor intended for a log on a ship and which is supported according to the invention.

DESCRIPTION OF THE PREFERRED EMBODIMENT

On the drawing the hull of a ship is designated by 1. In this hull a holder 2 is fixed in a suitable manner and supports a rotor 4 by means of an axle 3. This rotor is provided with propeller-shaped guide surfaces 5, which bring about that the rotor 4 rotates around the axle 3 under the effect of the water which passes the rotor 4 at the motion of the ship. The indication of the speed of rotation of the rotor, which constitutes a measure of the speed of the ship, can be realized in a manner known in itself in that the rotor is provided with a transmitter magnet 6 which cooperates with a pickup element 20 arranged in the holder. This element may consist of a winding wherein the transmitter magnet by means of an induction generates an AC voltage, or it may consist of a relay contact which is closed and opened under the effect of the transmitter magnet, or it may be made in some other optional manner of design. This pickup element is further assumed to be connected to an indicator, known in itself, in the ship by way of a conductor 21.

The axle 3 is joined solidly to the holder 2 and near its free end it supports and is connected with a magnet element 8 comprising a permanent magnet which in the present case is assumed to be radially magnetized, as indicated by the designations N and S in the drawing. Furthermore the axle 3 is surrounded by a second magnetic element 7 which is magnetized at the parts facing towards the magnetic element 8 in the same manner as the same, i.e. radially and with the poles arranged so as shown in the drawing. This other magnetic element 7 can be formed by the same magnet which is embodied in the transmitter magnet 6. In the parts of the transmitter magnet 6 facing the holder 2 the transmitter magnet 6 is provided with a radial bearing 9 which in view of the small weight of the rotor may be realized as a simple slide bearing. Another radial bearing for the rotor is formed by a plug 10 screwed into the rotor 4 and cooperating with a part of the axle 3 near its free end.

The magnetic elements 7 and 8 are so magnetized that they repel each other, with the result that they endeavor to move the rotor towards the left in the position indicated on the drawing. This repulsion movement is limited by an axial contact seating between the free end of the axle and the rotor body. In the present case this is formed by a sapphire ball 11 against which the contact surfaces 12 and 13 of the axle 3 and the plug 10 respectively are kept pressed under the influence of the said magnetic forces.

The rotor described here is assumed to be mounted so on the outside of the ship's hull 1, that the water flows towards the right in the drawing if the ship is in motion. At very low speeds, that is at the lower limit of the speed range which the log is supposed to cover, a certain axial friction exists in the contact seating 11–13. This is however very low owing to the design of the seating, so that it has no effect on the reliability of the measuring result. As soon as the speed of the ship increases the flowing water endeavors to move the rotor 4 to the right so that the axial load in the contact seating 11–13 diminishes and consequently also the axial friction. At a certain speed, which lies within the range which the log is intended to cover, the flowing water is able to overcome the force of repulsion between the magnetic elements 7 and 8 so that the contacts in the contact seating 11–13 become loose. This means that the axial friction goes down to zero, and this applies within the whole of the actual speed range. Only when the speed of the ship has attained the upper limit of this range which the log is intended to cover, the magnetic elements 7 and 8 come so close together that mechanical contact occurs. Owing to the fact that the flowing water then has a high speed in relation to the rotor 4, the axial friction in this case may have a high value without having a noticeable effect on the accuracy of the measurement and it is kept within acceptable limits by virtue of the one magnetic element being joined to a stop plate 14 of a suitable material for example steel, against which an annular surface 15 joined to the other magnetic element comes into contact. The latter may be made of Teflon.

So that the above-mentioned radial bearing 9 does not have to be made completely watertight, any water penetrating, which at high speeds would brake the rotation, can be removed in the following manner. In the outer wall of the rotor holes 16 are included which are directed outwards and backwards. Owing to the centrifugal force any water present in the rotor is thrown out through these holes. The water so eliminated is replaced by air which can be supplied from the inside of the ship through a tube 17 which communicates with a duct 18 inside the axle 3, a hole 19 being present in the wall of the axle 3 and into the inside of the rotor 4.

When the speed of the water passing by the rotor 4 varies, the rotor will move to-and-fro axially in relation to the axle. This pumping movement contributes to keeping the gap between the holder 2 and the rotor 4 and also the radial bearing 9 free from contaminations, such as algae.

I claim:

1. A rotor assembly comprising a fixed axle, a rotor rotatably mounted for rotation about said fixed axle, axial thrust-bearing means, a first magnetic element secured to said axle for rotation therewith, a second magnetic element secured to said rotor for rotation therewith, said first and second magnetic elements being constructed and arranged to exert an axial thrust on said rotor axially of said axle in a first direction, axial thrust-bearing means constructed and arranged to bear axial thrust exerted in said first direction, means to rotate said rotor to exert an axial thrust on said rotor axially of said axle in a second direction opposite to said first axial direction whereby an increasing axial load in said second direction diminishes the thrust exerted on said thrust bearing means to zero such that within a nominal operating range of rotation of said rotor the axial thrust is taken up by the magnetic forces acting between said first and second magnetic elements.

2. A rotor assembly according to claim 1 wherein said first and second magnetic elements are arranged to repulse one another axially of said axle.

3. A rotor assembly according to claim 2 wherein said rotor includes a housing enclosing said first and second magnetic elements.

4. A rotor assembly according to claim 3 wherein said axle extends through said second magnetic element.

5. A rotor assembly according to claim 2 wherein said thrust bearing means comprises a bearing surface at the free end of said axle and a bearing surface integral with said rotor.

6. A rotor assembly according to claim 2 wherein said rotor includes a housing, said housing including apertures for ejecting fluid from within said housing during rotation thereof.

7. A rotor assembly according to claim 6 wherein said axle includes a duct for passing a fluid into the rotor housing to replace fluid ejected therefrom.